Figures 1, 2:
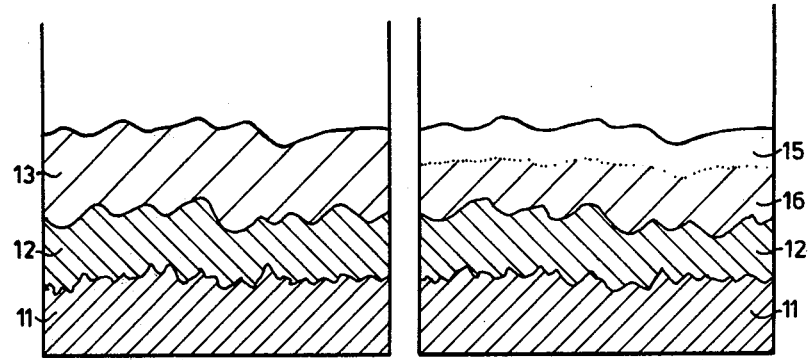

United States Patent [19]

Hails et al.

[11] 4,191,579

[45] Mar. 4, 1980

[54] ANTIFOULING PAINT COMPRISING A COPOLYMER CONTAINING ORGANO TIN SALT AND A PIGMENT HAVING A COMPONENT WHICH REACTS WITH SEA WATER AND ANOTHER COMPONENT WHICH DOES NOT REACT WITH SEA WATER

[75] Inventors: George Hails, Whickham; John D. Symonds, Witton Gilbert, both of England

[73] Assignee: The International Paint Company Limited, London, England

[21] Appl. No.: 841,535

[22] Filed: Oct. 12, 1977

[30] Foreign Application Priority Data

Oct. 18, 1976 [GB] United Kingdom .............. 43172/76

[51] Int. Cl.$^2$ .............................................. C08L 33/02
[52] U.S. Cl. .............................. 106/15 R; 260/429.7; 424/288
[58] Field of Search .............. 106/15 R; 424/288; 260/429.7

[56] References Cited

U.S. PATENT DOCUMENTS

| | | | |
|---|---|---|---|
| 3,476,577 | 11/1969 | Davie | 428/149 |
| 3,854,960 | 12/1974 | Plum et al. | 106/15 R |
| 3,912,519 | 10/1975 | Takage et al. | 106/15 R |
| 3,979,354 | 9/1976 | Dykman et al. | 106/15 R |
| 4,021,392 | 5/1977 | Milne et al. | 106/15 R |

FOREIGN PATENT DOCUMENTS

| | | | |
|---|---|---|---|
| 2216913 | 9/1974 | France | 106/15 R |
| 1457590 | 12/1976 | United Kingdom | 106/15 R |

*Primary Examiner*—Maurice J. Welsh
*Attorney, Agent, or Firm*—Davis, Hoxie, Faithfull & Hapgood

[57] ABSTRACT

An antifouling paint for ships' hulls, comprising a film-forming copolymer and a pigment component, has the property that a rough film of the paint becomes smoother in relatively moving seawater. The film-forming copolymer contains from more than 50 up to 80 percent by weight of units of at least one triorganotin salt of an olefinically unsaturated carboxylic acid, the balance of the copolymer being units of at least one olefinically unsaturated comonomer. The pigment component comprises a metalliferous pigment capable of reacting with seawater to form a water-soluble metal compound and a pigment which does not react with or dissolve in seawater.

8 Claims, 6 Drawing Figures

ANTIFOULING PAINT COMPRISING A COPOLYMER CONTAINING ORGANO TIN SALT AND A PIGMENT HAVING A COMPONENT WHICH REACTS WITH SEA WATER AND ANOTHER COMPONENT WHICH DOES NOT REACT WITH SEA WATER

This invention is concerned with an antifouling paint for application to ships' hulls.

The growth of marine organisms on the submarine parts of a ship's hull increases the frictional resistance of the hull to passage through water, leading to increased fuel consumption and/or a reduction in the speed of the ship. Marine growths accumulate so rapidly that the remedy of cleaning and repainting as required in drydock is too expensive to contemplate. The alternative, which has been practised with increasing efficiency over the years, is to limit the extent of fouling by applying to the hull a top coat paint incorporating antifouling agents. The antifouling agents are biocides which are freed from the surface of the paint over a period in concentrations lethal to marine organisms at the hull surface. The antifouling paint fails only when the concentration of biocide available at the paint surface falls below the lethal concentration, and with modern paints up to two years of useful life is expected.

The better antifouling paints are thus effective in delaying the gross infestation of hulls for considerable periods, but a top coat paint on a ship's submarine surface has irregularities from its method of application and is furthermore subject to breakdown and delamination during service, increasing the roughness of the hull so that the performance of the ship falls off, even when fouling is prevented. A new ship with a freshly painted hull usually has a roughness between $75\mu$ and $125\mu$, the roughness being the average height of peaks above troughs in the film as measured by the method employed by the British Ship Research Association. During the service life of a ship the roughness may increase to $500\mu$ to $750\mu$ due to the onset of corrosion and deficiencies in the hull maintenance and painting process. When the roughness increases from $75\mu$ to $125\mu$ initially to $750\mu$ an increased shaft horse power of 40 percent is required to maintain the same speed.

Put another way, the speed of an initially smooth-hulled ship may be reduced from 15 knots to 13.5 knots at the same shaft horse power as the hull acquires a roughness of $750\mu$. The speed loss due to fouling and hull roughness was the subject of a paper by Mr. I. E. Telfer entitled "Some aspects of the external maintenance of tankers" given at the joint meeting of the Royal Institution of Naval Architects and the Ordem dos Engenheiros in Lisbon, Portugal in October 1971. His results are reproduced in graphical form in FIG. 1 of our copending British application 14723/74 (Serial No. 1,457,590).

British Patent Application No. 14723/74 (Serial No. 1,457,590) describes and claims an antifouling paint composition which functions to give a fouling-free surface. A film of the paint applied as a top coat to a ship's hull has the remarkable property that it at least preserves its surface smoothness in relatively moving seawater and generally improves it, so that the paint film becomes smoother during the ordinary traffic of the ship, leading to improved efficiency during service. The antifouling paint composition is based on a film-forming copolymer containing from more than 50 up to 80 percent by weight of units of at least one triorganotin salt of an olefinically unsaturated carboxylic acid, the balance of the copolymer being units of at least one olefinically unsaturated comonomer. Such a copolymer becomes soluble in seawater when depleted of its triorganotin content by ion exchange with the seawater. The paint composition of British Patent specification No. 1,457,590 uses as pigment a substantially water-insoluble metalliferous pigment capable of reacting with seawater to form a water-soluble metal compound. It also includes as an ingredient a specified minimum amount of a hydrophobic organic retarder having certain specified properties for retarding the rate of dissolution of the paint film in relatively moving seawater.

According to the present invention, an antifouling paint for ships' hulls comprises:
(a) a film-forming copolymer containing from more than 50 up to 80 percent by weight of units of at least one triorganotin salt of an olefinically unsaturated carboxylic acid, the balance of the copolymer being units of at least one olefinically unsaturated comonomer, and
(b) a substantially water-insoluble pigment component, part of which comprises a metalliferous pigment capable of reacting with seawater to form a water-soluble metal compound and at least 5 percent by weight of which comprises a pigment which does not react with or dissolve in seawater, the proportion of the metalliferous pigment capable of reacting with seawater to form a water-soluble metal compound being sufficient that a rough film of the paint becomes smoother in relatively moving seawater. The antifouling paint according to the invention exhibits the antifouling action to be expected from its ability to release triorganotin ions into seawater as well as the remarkable property of the paint described in British Patent specification No. 1,457,590 that relatively moving seawater smooths the painted surface.

Figure 5:
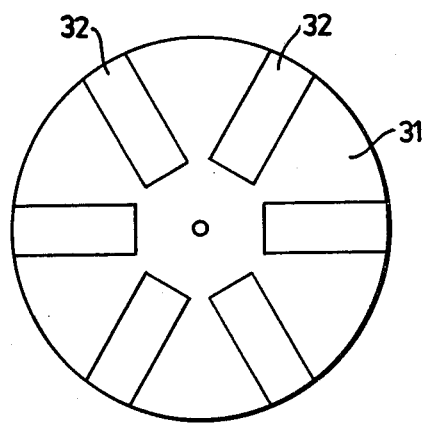
Figure 6:
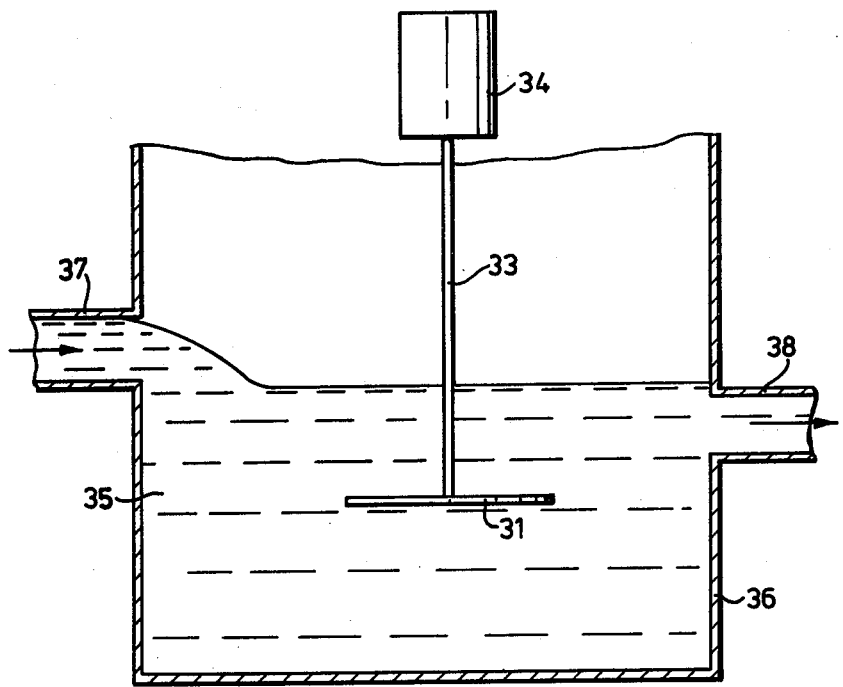

The effects of paints according to the invention will be described by reference to the accompanying drawings, of which FIGS. 1 to 4 are diagrammatic cross-sections through films of antifouling paint on the hull of a ship, FIG. 5 is a plan of a test disc used to test paints according to the invention and FIG. 6 is a sectional elevation of an apparatus using the test disc of FIG. 5.

The difference in the performance of the antifouling paint according to the invention and a conventional antifouling paint is illustrated in FIGS. 1 to 4 of the accompanying drawings. All of those four figures are diagrammatic cross-sectional views through part of the hull of the ship showing the steel plate of the hull 11, the anticorrosive paint 12 and the antifouling paint 13 or 23. FIG. 1 represents a newly painted hull using a conventional antifouling paint 13 and FIG. 2 shows the hull with the same paint near the end of its useful life, that is about 18 months later. As seen in FIG. 2, an antifouling agent dispersed in the film-forming matrix has been leached from the coating by seawater to a depth shown as a dotted line 14 between the regions 16 and 15. The outermost region 15 overlies the potentially useful antifouling region 16, inhibiting the leaching of antifouling agent in lethal concentrations from that region to the outer surface of region 15 so that fouling ensues.

Figures 3, 4:
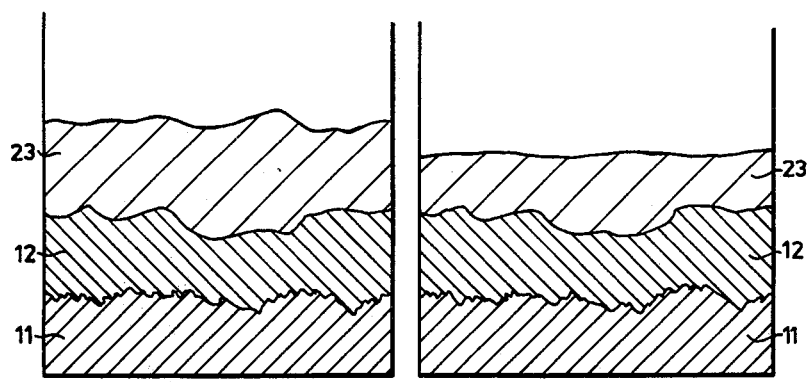

FIG. 3 represents a hull freshly painted with a top coat of antifouling paint 23 according to this invention on an underlying anti-corrosive paint 12. Over a period, the top coat paint is planed by the seawater, becoming thinner and smoother as shown in FIG. 4, yet the antifouling capability is unchanged and no inactive surface develops to hinder the release of the antifouling agent.

The smoothing performance of paints in relatively moving seawater can be tested in the apparatus shown schematically in FIGS. 5 and 6. The mild steel disc 31 shown in FIG. 5 having a diameter of 23 cm is coated overall with a conventional anti-corrosive paint and overcoated in radial stripes such as 32 with the paints under test. The stripes are applied by a standardised applicator adapted to deposit a film $20\mu$ thick (wet thickness).

The disc 31 is mounted on a shaft 33 driven by an electric motor 34 and immersed in flowing seawater 35 contained in a vessel 36 having an inlet 37 and overflow 38. The peripheral speed of the disc 31 is 33 knots.

During this test the paint films under test in stripes 32 are planed away, eventually to the extent that the underlying substrate (the anti-corrosive paint) is revealed. There is always some variation in the thickness of the paint film within each stripe so that the stripe of paint does not suddenly vanish; an increasing proportion of the substrate is revealed over time. When the substrate is revealed over 50 percent of the area of the stripe it is a good approximation to say that the paint film in the stripe 32 has lost by planing the original average dry thickness of the paint film in the stripe. The time in days to achieve this ("$D^{50}$") is a measure of the rate of planing of the paint in relatively moving seawater.

The surface of the paint film in each stripe 42 should be examined during the test to note whether it is smooth and firm. Paint films according to the invention which at least retain their initial smoothness must be distinguished from paint films which are removed over at least a portion of the stripe 42 by flaking or localised erosion causing roughening or by separation from the disc 31.

The above test can be used to give an absolute rate of planing of the paint film, but the temperature, composition and flow rate of the seawater can affect the result. The test is preferably used as a comparison in which one of the stripes 32 is an antifouling paint known to have the desired rate of dissolution in relatively moving seawater. The paint described below in Example 1 of this application has been found so far to show good antifouling and self-smoothing properties and a rate of dissolution in relatively moving seawater suitable for most ships in commercial service. This paint can be used as a comparison for paints under test; in general paints should have a $D^{50}$ 0.2 to 5 times that of the paint of Example 1. The paint described in Example 1 of British Patent specification No. 1,457,590, using Copolymer C and 30 percent by weight dichlorodiphenyl trichloroethane based on the organotin content of the copolymer, is another commercially successful paint which can be used as a reference stripe in tests.

To make comparisons more accurate, the dry thickness of the antifouling paint in each stripe 32 can be measured before the test and the rate of planing calculated accordingly. Alternatively if a standard application is used the dry film thickness can be calculated from the wet film thickness and the percentage solids by volume V in each case. A "rotor factor" for the paint x under test compared to a reference paint y can be calculated according to:

$$\text{Rotor factor} = \frac{D_y^{50} \times V_x}{D_x^{50} \times V_y}$$

The apparatus of FIGS. 5 and 6 can also be used to test whether a paint becomes smoother in relatively-moving sea-water according to this invention. In this case the paint under test is applied to the disc 31 over one whole face, rather than in stripes, at a dry film thickness of about 100 microns. It is arranged to have a surface roughness of about 50 microns as measured by the British Ship Research Association's wall guage. The paint film may be roughened by combing it while it is partially dry or the paint film can be applied by brush roughly to leave brush marks having a roughness of about 50 microns. The disc 31 is then rotated as shown in FIG. 6 at a peripheral speed of 33 knots for one month in seawater. After one month the paint film should show a decrease in roughness which can be measured by the British Ship Research Association's wall guage (that is, the roughness should be measurably less than the roughness of the film before rotation in sea-water).

Upon contact with seawater, the copolymer in paints according to the invention generates a water-soluble residue which essentially is a copolymer salt formed as a result of the depletion in the copolymer organotin content caused by exchange of tin ions for metal ions present in the seawater. It has been found that the copolymer must contain more than 50 percent by weight of organotin salt units in order to generate the water-soluble residue at a sufficient rate. If the organotin content of the copolymer is less than about 50 percent, the organotin ion may still be exchanged with a metal ion from seawater, but the residual polymer either separates from the ship's hull in a way which does not lead to a smoother surface, or remains upon the hull. In the latter case the paint behaves similarly to the known antifouling paints as described with reference to FIGS. 1 and 2.

The more the organotin salt content of the copolymer exceeds 50 percent by weight, the greater the rate of ion exchange with seawater and the quicker the copolymer becomes water-soluble enough to be swept away from the paint surface by the seawater flowing over the surface.

The triorganotin salt of the olefinically unsaturated carboxylic acid incorporated in the copolymer suitably has the general formula $$R_3SnOOCCR'=CHR''$$

where the three groups R are the same or different alkyl radicals containing up to 8 carbon atoms or aryl or aralkyl radicals, R' is H or methyl and R" is H or -COOSn R$_3$, where R is defined as above. Thus the cation of the salt, R$_3$Sn$^+$, is exemplified by tributyl tin, tripropyl tin, triethyl tin, tribenzyl tin, diethylbutyl tin, tribromophenyl tin, diphenyltolyl tin, tritolyl tin, diethylphenyl tin, ethyldiphenyl tin, octyldiphenyl tin and diethyloctyl tin. The preferred cations are those having three identical organic groups attached to the tin atom. The anion of the salt, $-OOCCR'=CHR''$, may be, for example, acrylate, methacrylate, maleate or fumarate. Examples of the salt come from pairing any listed anion with any listed cation.

The copolymer also contains units of at least one ethylenically unsaturated comonomer. Substances suitable as comonomers are acrylic monomers, for example methyl methacrylate, ethyl acrylate, propyl acrylate, butyl acrylate, amyl acrylate, hexyl acrylate and the corresponding esters of methacrylic acid, acrylonitrile, methacrylonitrile, acrylamide and methacrylamide, and vinyl monomers, for example vinyl acetate, vinyl butyrate, vinyl chloride, styrene and vinyl pyridine.

The copolymer preferably comprises methacrylate salts of the triorganotin and methacrylate and/or acrylate esters as the comonomers.

Preferably the triorganotin salt component forms from 55 to 70 percent by weight of the copolymer and variations in the proportion of such salt component in combination with variations in the proportions of pigments capable of reacting with seawater and pigments which do not react with seawater can be used to provide paints having a range of susceptibilities to the smoothing action of seawater. High proportions (approaching 95 percent by weight of the pigment component) and low proportions (approaching 50 percent by weight of the pigment component) of pigments which react with the seawater provide paints which are respectively the most and the least susceptible to the smoothing action of seawater likely to be required in practice.

The substantially water-insoluble pigment which is capable of reacting with seawater to form a water-soluble metal compound is exemplified by zinc oxide, cuprous thiocyanate, copper acetoarsenite, cuprous oxide, zinc chromate, copper 8-hydroxyquinolinate, zinc dimethyl dithiocarbamate, copper dimethyl dithiocarbamate and copper borate glasses as described in U.S. Pat. No. 3,476,577. The preferred seawater reactive pigments are zinc oxide, cuprous oxide and cuprous thiocyanate; cuprous oxide is a valuable pigment because of its biocidal activity which augments that of the triorgano tin copolymer but it can cause premature gellation of the copolymer. We have found that paints according to the invention containing cuprous oxide usually cannot be stored for more than six months. If longer storage is required a two-pack paint in which a cuprous oxide dispersion is kept separate from the copolymer solution is preferably used.

The use of a water-insoluble pigment component according to the invention has the effect of controlling the overall smoothing which the relatively moving seawater exerts on the paint film. The particles of the metalliferous pigment which reacts with seawater to form a water-soluble metal compound do not survive at the paint surface. As the particles of this pigment dissolve, the paint film structure is opened up to allow the seawater to contact the copolymer. However, although the combination of a copolymer containing more than 50 percent by weight of organotin salt and the seawater-reactive pigment is itself an antifouling paint, it is of such short service life due to its rate of dissolution in relatively moving seawater as to be uneconomical.

The use of a water-insoluble pigment which does not react with seawater is discountenanced in British Patent specification No. 1,457,590 as giving no improvement in smoothness to the paint film. However, we have now found that the use of such an inert pigment in combination with the metalliferous pigment capable of reacting with seawater controls the rate of dissolution of the paint film in relatively moving seawater. The solubility in seawater of the inert pigment should generally be less than 1 part per million and preferably much less.

The proportion of pigment component to copolymer in the paint is preferably such as to give a pigment volume concentration of at least 25 percent but less than the critical pigment volume concentration, for example 25–50 percent, in the dry paint film. The critical pigment volume concentration is the maximum pigment volume concentration at which the film forming material wets all the pigment particles and is usually 50–55 percent for the copolymers and pigments specified above. Within this pigment component, the relative proportions of the metalliferous pigment capable of reacting with seawater and the inert pigment which does not react with or dissolve in seawater are such that the paint becomes smoother in relatively moving seawater but preferably does not dissolve so quickly as to be uneconomical.

The maximum proportion of inert pigment to seawater reactive pigment which can be included varies with many factors including the composition of the tin-containing copolymer and the nature of the seawater-reactive pigment, but generally the percentage by volume of the inert pigment based on the total pigment component is less than the percentage by weight of the triorganotin salt component in the copolymer. Usually the inert pigment comprises 5 to 50 percent by weight of the total pigment component, for example 10 to 35 percent by weight when seawater-soluble and inert pigments of similar specific gravities are used, for example zinc oxide or cuprous oxide as seawater-reactive pigment and titanium dioxide or ferric oxide as inert pigment.

More particularly, zinc oxide and other zinc compounds tend to promote more rapid dissolution of the paint film in relatively moving seawater than copper compounds such as cuprous thiocyanate. When the triorganotin salt component forms 55 to 70 percent by weight of the copolymer and the seawater-reactive pigment is zinc oxide the ratio of zinc oxide to inert pigment is preferably 40:60 to 85:15 by volume. For these copolymers using cuprous thiocyanate or cuprous oxide as the reactive pigment the ratio of cuprous thiocyanate or cuprous oxide to inert pigment is preferably 60:40 to 90:10 by volume.

The insoluble and unreactive pigment can, for example, be titanium dioxide or ferric oxide. Some colouring pigments such as carbon black and phthalocyanine green are also insoluble and unreactive with seawater. These colouring pigments are generally used in amounts of less than 4 percent by weight of the total pigment. They are included in the insoluble and unreactive pigment when calculating the proportion that this forms of the total pigment component. Other insoluble materials often used in marine paint compositions are silica and clays such as bentonite, which are used to control the flow and settling properties of the paint. These materials used to control the flow and settling properties are not regarded as pigments and are not included when calculating the proportions of the seawater-reactive and unreactive pigments.

The paint according to the invention can also contain a hydrophobic, non-volatile (i.e., of negligible vapour pressure at 25° C.) organic retarder having a solubility in seawater at 25° C. of not more than 5 parts per million by weight and miscible with the film-forming copolymer, as described in British Patent specification No. 1,457,590, although in paints of the present invention the retarder is not necessary to achieve a satisfactory control of the rate of dissolution of the paint film. If used, such a hydrophobic non-volatile organic retarder can be present in amounts of up to 25 percent by weight of the film-forming copolymer, frequently about 2 percent by weight or more of the film-forming copolymer. Care must be taken not to use too high a proportion of organic retarder with a high proportion of a powdered solid material which does not react with seawater lest the smoothing of the paint film and release of organotin ions should cease or become unacceptably slow. Examples of hydrophobic non-volatile organic retarders are silicone fluids, chlorinated diphenyl, chlorinated paraffin wax, naphthalene, diphenyl ether, dichlorodiphenyl trichloroethane and low molecular weight polybutene.

The antifouling paint according to the invention can also contain an auxiliary antifouling agent, for example a sparingly soluble organic biocide. Such an auxiliary antifouling agent may be desirable in paint applied to a ship which is likely to remain static for long periods of time in waters where fouling can occur.

The paint may be applied to the ship, for example, by a spray, as a suspension of the pigment component in a solution of the copolymer in a volatile solvent such as xylene and aromatic solvent mixtures of similar boiling point, for example, Shellsol A or Aromasol H, butyl acetate, amyl acetate, white spirit or a blend thereof with an aromatic solvent, methyl isobutyl ketone, methyl isoamyl ketone, toluene or ethylene glycol monoethyl ether or its acetate.

The invention is illustrated by the following Examples in which parts and percentages are by weight. Rough films of all the paints described in the Examples passed the test of becoming smoother in relatively moving seawater.

EXAMPLE 1

24 parts tributyltin methacrylate and 16 parts methyl methacrylate were dissolved in 60 parts xylene, and 0.35 part benzoyl peroxide was added. The temperature was raised gradually over 10 hours, cooling as necessary to control the exotherm, to a final temperature of 110° C.

The resulting 40 percent solution of a 60:40 tributyltin methacrylate: methyl methacrylate copolymer in xylene was blended with other components in the amounts shown below to form an antifouling paint:

|  | Parts |
| --- | --- |
| Copolymer Solution | 63.0 |
| Cuprous thiocyanate | 17.9 |
| Titanium dioxide | 7.0 |
| Phthalocyanine Green | 1.3 |
| Colloidal silica | 0.7 |
| Bentonite | 1.0 |
| Xylene | 7.8 |
| Tributyltin oxide | 0.8 |
| Butyl alcohol | 0.5 |

The cuprous thiocyanate acts as the seawater-reactive pigment component and the titanium dioxide and phthalocyanine green form the unreactive and insoluble pigment component.

Test panels painted with the above paint were attached to the bilge keel of a ship. After 12 months the painted panels had become smoother and had not fouled whereas the surround of the test panels which was not painted with antifouling paint showed heavy fouling. The pigment volume concentration in this example was 31.6 percent and the ratio of cuprous thiocyanate to the inert pigments was about 71:29 by volume.

EXAMPLE 2

The following ingredients were blended to form a paint:

|  | Parts |
| --- | --- |
| Copolymer solution of Example 1 | 63.0 |
| Cuprous thiocyanate | 17.6 |
| Titanium dioxide | 6.5 |
| Phthalocyanine green | 1.1 |
| Colloidal silica | 0.7 |
| Bentonite | 1.0 |
| Chlorinated paraffin | 1.9 |
| Xylene | 6.9 |
| Tributyltin oxide | 0.8 |
| Butyl alcohol | 0.5 |

This paint contains chlorinated paraffin, which is a hydrophobic non-volatile organic retarder having a solubility of less than 5 parts per million, as well as an unreactive and insoluble pigment component. When painted on test panels it showed smoothing with no fouling.

The paints described in the above Examples can have a further biocide added to them, to reinforce the action of the tin-containing copolymer, particularly when a ship is stationary for a week or more and the lack of movement relative to the seawater reduces the effect of the tin-containing copolymer.

EXAMPLE 3

The following ingredients were blended to form a paint:

|  | Parts by weight |
| --- | --- |
| Copolymer solution of Example 1 | 59.2 |
| Cuprous thiocyanate | 22.8 |
| Titanium dioxide | 4.4 |
| Phthalocyanine blue pigment | 1.2 |
| Colloidal silica | 0.7 |
| Bentonite | 0.9 |
| Tributyl tin oxide | 0.7 |
| Xylene | 10.1 |

The titanium dioxide and phthalocyanine blue pigment are both pigments insoluble in and unreactive with sea-water.

When tested on the apparatus of FIGS. 5 and 6, the paint was planed away by relatively-moving sea-water although the surface of the paint film remained firm and smooth. Its rate of removal was about 1.2 times that of the paint of Example 1 indicating that it would be an effective antifouling and self-smoothing paint similar in properties to the paint of Example 1.

The pigment volume concentration in this example was 35 percent and the ratio of cuprous thiocyanate to the inert pigment was about 82:18 by volume.

EXAMPLE 4

The following ingredients were blended to form a paint:

|  | Parts by weight |
| --- | --- |
| Copolymer solution of Example 1 | 48.2 |
| Zinc oxide | 35.6 |
| Titanium dioxide | 6.1 |
| Colloidal silica | 0.6 |
| Bentonite | 0.7 |

-continued

| | Parts by weight |
|---|---|
| Tributyl tin oxide | 0.6 |
| Xylene | 8.2 |

The zinc oxide acts as a sea-water-reactive pigment and the titanium dioxide is the pigment insoluble in and unreactive with sea-water.

When tested on the apparatus of FIGS. 5 and 6, the paint was planed away by relatively-moving sea-water in the same manner as the paint of Example 1 but about twice as fast. This result indicates that it would be an effective antifouling and self-smoothing paint although not as economic for most purposes as the paint of Example 1.

The pigment volume concentration in this example was 35 percent and the ratio of zinc oxide to titanium dioxide was about 81:19 by volume.

EXAMPLE 5

The following ingredients were blended to form a paint:

| | Parts by weight |
|---|---|
| Copolymer solution of Example 1 | 49.6 |
| Zinc oxide | 24.5 |
| Titanium dioxide | 15.5 |
| Colloidal silica | 0.6 |
| Bentonite | 0.8 |
| Tributyl tin oxide | 0.6 |
| Xylene | 8.4 |

When tested on the apparatus of FIGS. 5 and 6, the paint was planed away by relatively-mocing sea-water in the same manner as the paint of Example 1. Its rate of removal was about 1.2 times that of the paint of Example 1, indicating that it would be an effective antifouling and self-smoothing paint.

The pigment volume concentration in this example was 35 percent and the ratio of zinc oxide to titanium dioxide was about 54:46 by volume.

EXAMPLE 6

65 parts tributyl tin methacrylate and 35 parts methyl methacrylate were copolymerised in xylene using benzoyl peroxide initiator by the process described in Example 1 to form a 40 percent solids tributyl tin methacrylate methyl methacrylate copolymer solution. This 40 percent copolymer solution was used in the formulation of Example 5 to replace the copolymer solution of Example 1 and the ingredients were blended to form a paint.

When tested on the apparatus of FIGS. 5 and 6, the paint was planed away by relatively-moving sea-water in the same manner as the paint of Example 1. The rate of removal was about twice that of the paint of Example 1, indicating that it would be an effective antifouling and self-smoothing paint although not as economic for most purposes as the paint of Example 1.

EXAMPLE 7

The following ingredients were blended to form a paint:

| | Parts by weight |
|---|---|
| Copolymer solution of Example 1 | 47.6 |
| Zinc Oxide | 32.5 |
| Red iron oxide | 9.9 |
| Colloidal silica | 0.6 |
| Bentonite | 0.7 |
| Tributyl tin oxide | 0.6 |
| Xylene | 8.1 |

The red iron oxide (ferric oxide) is a pigment insoluble in and unreactive with sea-water.

When tested on the apparatus of FIGS. 5 and 6, the paint was planed away by relatively-moving sea-water in the same manner and at the same rate as the paint of Example 6.

The pigment volume concentration in this example was 35 percent and the ratio of zinc oxide to ferric oxide was about 75:25.

EXAMPLE 8

The following ingredients were blended to form a paint:

| | Parts by weight |
|---|---|
| Copolymer solution of Example 1 | 47.9 |
| Zinc oxide | 23.6 |
| Red iron oxide | 18.4 |
| Colloidal silica | 0.6 |
| Bentonite | 0.7 |
| Tributyl tin oxide | 0.6 |
| Xylene | 8.2 |

When tested on the apparatus of FIGS. 5 and 6, the paint was planed away by relatively-moving sea-water in the same manner as the paint of Example 1 but about 1½ times as fast, indicating that it would be an effective antifouling and self-smoothing paint.

The pigment volume concentration in this example was 35 percent and the ratio of zinc oxide to ferric oxide was 54:46 by volume.

EXAMPLE 9

The following ingredients were blended to form a paint:

| | Parts by weight |
|---|---|
| Copolymer solution of Example 1 | 38.8 |
| Zinc oxide | 28.9 |
| Titanium dioxide | 18.3 |
| Colloidal silica | 0.7 |
| Bentonite | 0.9 |
| Tributyl tin oxide | 0.4 |
| Xylene | 12.0 |

The pigment volume concentration in this example was 45 percent and the ratio of zinc oxide to titanium dioxide was about 54:46 by volume.

When tested on the apparatus of FIGS. 5 and 6, the paint was planed away by relatively-moving sea-water in the manner of the paint of Example 1. Its rate of removal (making allowance for a greater dry film thickness because of its high pigment volume concentration) was about the same as that of the paint of Example 8.

What is claimed is:

1. An anti-fouling paint for ships' hulls comprising:
   (a) a film-forming copolymer containing 55 to 70 percent by weight of units of at least one triorgano tin salt of an olefinically unsaturated carboxylic acid, the balance of the copolymer being units of at least one olefinically unsaturated comonomer, and (b) a substantially water-insoluble pigment component, part of which comprises a cuprous pigment selected from the group consisting of cuprous thiocyanate and cuprous oxide capable of reacting with sea water to form a water-soluble metal compound and part of which comprises an unreactive pigment which does not react with or dissolve in sea water, the ratio of cuprous pigment to unreactive pigment being 60:40 to 90:10 by volume.

2. A paint according to claim 1 having a pigment volume concentration of 25 to 50 percent.

3. A paint according to claim 1 in which the unreactive pigment comprises titanium dioxide.

4. A paint according to claim 1 in which the unreactive pigment comprises ferric oxide.

5. An anti-fouling paint for ships' hulls comprising (a) a film-forming copolymer containing 55 to 70 percent by weight of units of at least one triorgano tin salt of an olefinically unsaturated carboxylic acid, the balance of the copolymer being units of at least one olefinically unsaturated comonomer, and (b) a substantially water-insoluble pigment component, part of which comprises zinc oxide and part of which comprises an unreactive pigment which does not react with or dissolve in sea water, the ratio of zinc oxide to unreactive pigment being 40:60 to 85:15 by volume.

6. A paint according to claim 5 having a pigment volume concentration of 25 to 50 percent.

7. A paint according to claim 5 in which the unreactive pigment comprises titanium dioxide.

8. A paint according to claim 5 in which the unreactive pigment comprises ferric oxide.

* * * * *